United States Patent [19]
Albach et al.

[11] Patent Number: 4,962,349
[45] Date of Patent: Oct. 9, 1990

[54] BATTERY OPERATED POWER SUPPLY WITH LOW VOLTAGE START CIRCUIT

[75] Inventors: Manfred Albach, Aachen, Fed. Rep. of Germany; Hubert C. Raets, Nieuwenhagen, Netherlands

[73] Assignee: U.S. Philips Corporation, New York, N.Y.

[21] Appl. No.: 296,268

[22] Filed: Jan. 9, 1989

[30] Foreign Application Priority Data

Jan. 29, 1988 [DE] Fed. Rep. of Germany ....... 3802594
Sep. 3, 1988 [DE] Fed. Rep. of Germany ..... 38300016

[51] Int. Cl.$^5$ .............................................. G05F 1/44
[52] U.S. Cl. ................................. 323/265; 323/349; 323/901; 363/49
[58] Field of Search ............... 323/238, 265, 266, 268, 323/269, 270, 271, 272, 273, 274, 282, 283, 284, 290, 321, 349, 350, 351, 901; 363/49

[56] References Cited

U.S. PATENT DOCUMENTS

| 3,299,347 | 1/1967 | Torii | 323/901 X |
| 4,246,634 | 1/1981 | Purol | 323/901 X |
| 4,595,873 | 6/1986 | Musil | 323/901 X |
| 4,626,766 | 12/1986 | Musil | 323/901 X |
| 4,695,785 | 9/1987 | Mieth et al. | 323/222 |
| 4,740,742 | 4/1988 | Gontowski, Jr. | 323/901 X |

FOREIGN PATENT DOCUMENTS 0183972 9/1985 Japan .

Primary Examiner—Patrick R. Salce
Assistant Examiner—Emanuel Todd Voeltz
Attorney, Agent, or Firm—Bernard Franzblau

[57] ABSTRACT

A circuit arrangement for feeding a load (3) from a low voltage energy source (1) via a direct-voltage conversion circuit (2). The direct-voltage conversion circuit periodically takes energy from the energy source by means of a main switching element (10) and supplies this energy as an increased supply voltage (at 12) to the load via an inductive element (9) and a rectifier (11). A starting switching element (15) takes energy for generating the supply voltage (at 12) from the energy source during a starting phase. The circuit arrangement is simple and compact and the energy losses produced are so low that it is economic to use it for energizing a small appliance particularly a small domestic appliance, from a battery or a rechargeable accumulator. A main control circuit (13) is supplied with energy directly from the supply voltage (at 12) and periodically controls the main switching element. A starting control circuit (16) is fed directly and exclusively from the energy source and periodically controls the starting switching element (15) so that is switching periods are shorter than those of the main switching. The starting control circuit, and thus the starting switching element, are switched off when the supply voltage reaches a predetermined value.

10 Claims, 1 Drawing Sheet

BATTERY OPERATED POWER SUPPLY WITH LOW VOLTAGE START CIRCUIT

BACKGROUND OF THE INVENTION

This invention relates to a circuit arrangement for feeding a load from an energy source having a low output voltage via a direct-voltage conversion circuit which, by means of a main switching element, periodically takes energy from the energy source and supplies it with an increased supply voltage to the load via an inductive element and a rectifier, and which includes a starting switching element by means of which energy is taken from the energy source in a starting phase of the circuit arrangement for generating the feed voltage.

The English abstract of Japanese Application No. 60-183972, describes a circuit arrangement for a direct-voltage converter having a low input voltage. In this arrangement, the circuit arrangement and an oscillator are fed, on the one hand, via a diode from a low-voltage energy source and, on the other hand, from the high voltage of a tertiary winding of a transformer, which has been rectified by a separate rectifier and smoothed by a separate smoothing capacitor. A load is fed from the voltage which is generated via a secondary winding, a diode and a smoothing capacitor.

SUMMARY OF THE INVENTION

An object of the invention is to construct a circuit arrangement of the type initially mentioned in a simple and compact manner which at the same time will further reduce the energy losses produced in it in a manner such that it can be economically used for supplying energy to a small appliance from an energy source having a limited energy content. In particular, the circuit arrangement is intended to be usable for feeding a small domestic appliance from a primary or rechargeable battery having a low output voltage.

According to the invention, the above object is achieved by means of a main control circuit which is supplied with energy directly from the supply voltage and by which the main switching element is periodically controlled, and by means of a starting control circuit which is directly and exclusively fed from the energy source and by which the starting switching element is periodically controlled, the switching periods for the starting switching element being shorter than those for the main switching element and the starting control circuit so that the starting switching element is switched off when the feed voltage reaches a predetermined value.

According to the invention, the main switching element and the starting switching element are controlled by mutually separate control circuits. These control circuits can be specially designed for the output voltage of the energy source or for the feed voltage and thus their losses can be selectively reduced. In addition, the diode, which separates the feed voltage from the energy source in the prior art, now is omitted. Since this diode represents an expensive component in the case of a high feed voltage, the circuit arrangement according to the invention is simplified and also becomes cheaper in production. A further simplification is achieved by the fact that only a simple inductive element is needed in the invention and thus, apart from the expensive transformer of the prior art, a rectifier and a smoothing capacitor for high voltages can also be saved.

The starting switching element which, compared with the main switching element, is designed for operation, that is to say for being controlled, with low control voltages and in the starting phase of the circuit arrangement, particularly when beginning operation of the arrangement, for example during the switching on of the energy source, initially builds up, with a low power, the feed voltage from which the main control circuit is then supplied, is reduced in its constructional size in the present invention by the fact that the switching periods for the starting switching element are shorter than the switching periods by means of which the main control circuit controls the main switching element. The switching periods for the starting switching element are preferably selected to be distinctly shorter than those for the main switching element. As a result, the currents in the starting switching element are reduced in a manner such that it can be combined in a space-saving manner with the starting control circuit, preferably within a single integrated circuit. This saves volume and assembly costs.

The predetermined value of the feed voltage at which the starting control circuit and the starting switching element are switched off is preferably selected to be as low as is just possible to just allow proper operation of the main control circuit and thus of the main switching element.

Starting and main switching element are preferably connected in parallel. Generation of the feed voltage by means of the starting switching element, on the one hand, and by the main switching element, on the other hand, is then particularly effective.

In a preferred embodiment of the invention, the main switching element is constructed with a MOS field-effect transistor and the starting switching element is constructed with a bipolar transistor. The MOS field-effect transistor exhibits particularly low losses which enhance the efficiency of the circuit arrangement in operation with the main switching element. In contrast, the bipolar transistor can be driven by low voltages so that proper starting of the circuit arrangement with the output voltage of the energy source is ensured. The higher losses of the bipolar transistor, compared with that of the MOS field-effect transistor, are not significant as they occur only for a short time during this process.

The circuit arrangement according to the invention can be advantageously used when the load is formed by an electronically commutated direct-current motor. Such motors operate with very low losses so that, together with the circuit arrangement according to the invention, a good utilization of the energy from the energy source is achieved.

Further advantages developments of the invention will become apparent from the detailed description which will follow below.

BRIEF DESCRIPTION OF THE DRAWINGS

Some illustrative embodiments of the circuit arrangement according to the invention are shown, by way of example, in the drawing and are described in greater detail in the text which follows. In the drawing

DESCRIPTION OF THE PREFERRED EMBODIMENTS

Figure 1:
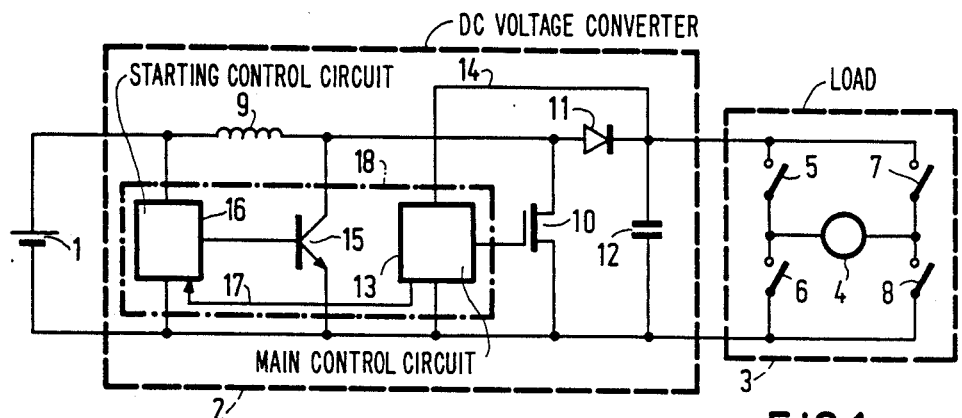
FIG. 1 shows a schematic representation of a first embodiment of the invention.

FIG. 1 shows an example of a circuit arrangement according to the invention having an energy source 1, represented as a battery, which, however, can also be constructed as a mains-supplied direct-voltage source or as an accumulator or as a combination thereof. The energy source essentially provides a low direct voltage as the output voltage on which a residual alternating-voltage component may also be superimposed. From the energy source 1, a load 3 is fed via a direct-voltage conversion circuit 2. This load consists, as indicated in FIG. 1, for example, of a direct-current motor 4 which is inserted into a full-wave bridge consisting of four switching elements 5, 6, 7, 8 for the purpose of electronic commutation. For the sake of simplicity, the switching elements 5, 6, 7, 8 are shown as mechanical switches, but in practice are constructed as semiconductor switching elements, for example, as MOS field-effect transistors. Electronic commutation is known in principle and will not be explained in greater detail here.

The direct-voltage conversion circuit 2 contains an inductive element 9 which is constructed as a simple two-terminal network, for example, as a coil with a ferrite core, in the present invention. The inductive element 9 is connected in series with a main switching element 10 and this series circuit is connected to the energy source 1. In the present example, the main switching element is constructed as an MOS field-effect transistor since this type of transistor operates with particularly low losses. In principle, a corresponding different component can also be used as the main switching element 10. The main switching element 10 is bypassed by the series circuit of a rectifier 11 and a smoothing capacitor 12. The feed voltage for feeding the load 3 is produced across the smoothing capacitor 12.

The direct-voltage conversion circuit 2 operates in a conventional manner by the fact that the main switching element 10 is periodically switched back and forth between the conducting and the blocking state so that the current pulses produced by this switching action in the inductive element 9 by the energy source 1 are rectified in the rectifier 11, freed of alternating-voltage components in the smoothing capacitor 12 and are then supplied to the load 3. For this purpose, the main switching element 10 is periodically driven by a main control circuit 13 which supplies a corresponding control voltage to the control electrode of the main switching element 10, the gate connection of the MOS field-effect transistor in the present example. The main control circuit 13 is supplied with energy via a line 14 from the supply voltage present across the smoothing capacitor 12. The direct voltage supplied by the energy source 1 is so low that a control voltage obtained therefrom is insufficient to operate the main switching element 10.

For the starting phase of the circuit arrangement, a starting switching element 15 is therefore provided, for example, a bipolar transistor, which also forms a series circuit with the inductive element 9 and which is connected to the energy source 1 and from which energy can be supplied to the smoothing capacitor 12 via the rectifier 11. For this purpose, the starting switching element 15, after the circuit arrangement has been put into operation, is periodically alternately switched to the conductive and to the blocking state by a starting control circuit 16. The voltage pulses occurring during this process in the cut-off state, via the starting switching element 15, drive a current through the rectifier 11 which charges up the smoothing capacitor 12. In the present example, the starting switching element 15 is advantageously connected in parallel with the main switching element 10.

The starting control circuit 16 essentially comprises an oscillator which supplies to the control electrode of the starting switching element 15, i.e., via the base connection of the bipolar transistor in the present example, a periodic switching voltage the switching periods of which are shorter than the switching periods by means of which the main control circuit 13 controls the main switching element 10. The switching periods for the starting switching element 15 are preferably shorter by a multiple of those for the main switching element 10.

The starting control circuit 16 is connected to the energy source 1 and is directly fed by the direct voltage supplied by it. In the first instant after the circuit arrangement has been placed into operation, that is to say at the beginning of the starting phase, only the starting control circuit 16 emits its switching voltage, whereas the main switching element 10 still remains in the blocking state. The supply voltage is built up on the smoothing capacitor 12 via the starting switching element 15. When it reaches a value which is sufficient to operate the main switching element 10, the main control circuit 13, supplied with the energy from the smoothing capacitor 12 via the line 14, begins to switch the main switching element 10. As a result, the smoothing capacitor is supplied with further energy and it is charged up to the value of the supply voltage which it assumes for the operation of the circuit arrangement. When the supply voltage reaches a predetermined value during this charging process, the main control circuit 13 emits a switch-off signal, for example, in the form of a direct voltage derived across the supply voltage from the smoothing capacitor 12, for switching-off the starting control circuit 16, via a switch-off line 17 in the present example. The switch-off signal interrupts the generation of the periodic switching voltage in the starting control circuit 16 and switches the starting switching element 15 to the blocking state. In the further operation of the switching arrangement, only the main switching element 10 with the main control circuit 13 is then effective, whereas in the starting switching element 15 and in the starting control circuit 16 almost no further currents flow and as a result no further losses occur.

The main control circuit 13 can comprise in a manner known per se a regulator for the value of the feed voltage. The value of the supply voltage to be regulated is then also supplied via line 14 as the actual value to the regulator. In this arrangement, the range of regulation is limited at low values of the supply voltage in such a manner that the operation of the main control circuit 13 is properly ensured, that is to say also that the main switching element 10 can be properly controlled. Otherwise, the direct-voltage conversion circuit 2 would be exclusively or mainly operated via the starting switching element 15 in this low range of values of the supply voltage.

The dot-dashed line 18 in FIG. 1 outlines the circuit parts which can be advantageously combined in a monolithically integrated circuit in this example. In this connection, the bipolar transistor used as the starting switching element 15 requires little space on the semiconductor crystal since it carries only very low currents due to being driven with very short switching periods. The oscillator in the starting control circuit 16 can be constructed very simply and thus also in a space-saving manner since neither the amplitude nor the switching period of the periodic switching voltage emitted by it are subject to special accuracy requirements.

Figure 2:
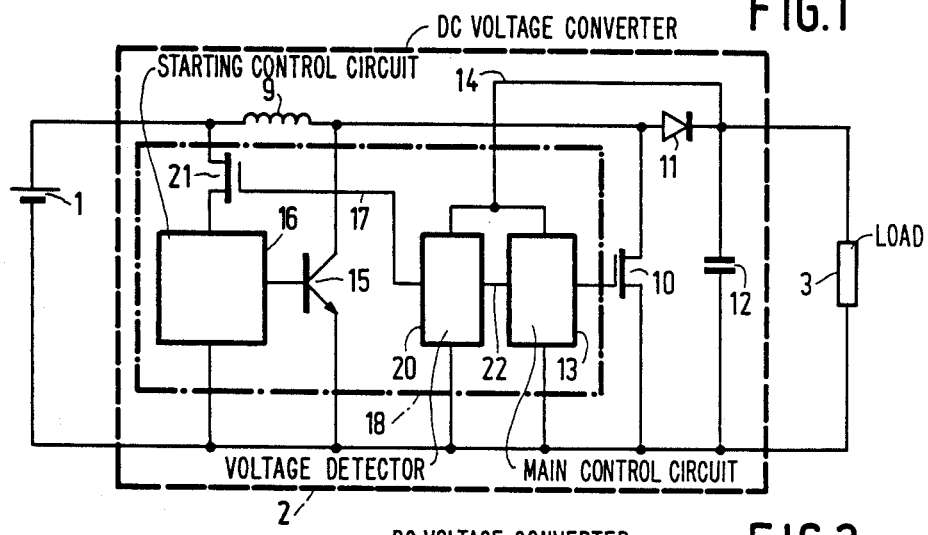
FIG. 2 shows a variation of the circuit according to FIG. 1.

FIG. 2 shows a variation of the circuit arrangement according to FIG. 1 in which elements already described are provided with the same reference symbols as are used in FIG. 1. This circuit arrangement contains a voltage detector 20 by which the voltage across the smoothing capacitor 12 is detected and the starting control circuit 16 is switched off when the predetermined voltage value is reached. For this purpose, the voltage detector 20 is supplied via line 14 with the supply voltage from the smoothing capacitor 12. FIG. 2 furthermore shows an advantageous example of a switching-off arrangement of the starting control circuit 16. For this purpose, the latter is fed from the energy source 1 via a switch-off element 21 which is switched to the blocking state when the feed voltage reaches the predetermined value. For this purpose, the switch-off signal from the voltage detector 20 is supplied via the switch-off line 17 to the switch-off element 21. The switch-off element 21 is preferably constructed as a transistor, particularly as a MOS field-effect transistor, and the switch-off line 17 is connected to its control electrode, for example, the gate connection.

In the example according to FIG. 2, a switching line 22 is also run from the voltage detector 20 to the main control circuit 13 via which the latter is put into operation in conjunction with the switching-off of the starting control circuit 16. For this purpose, the switching line 22 can carry the switch-off signal or a switching signal generated in correspondence thereto. Thus, the starting control circuit 16 or the main control circuit 13 is selectively put into operation by the voltage detector 20. Preferably, the main control circuit 13 is already put into operation by the switching signal at a value of the feed voltage which is less by a certain amount than the predetermined value of the supply voltage at which the starting control circuit 16 is switched off. An overlap of the ranges of the feed voltage within which the main control circuit 13 and the starting control circuit 16 operate then occurs. This ensures in any case, even with the occurrence of production tolerances, that the circuit arrangement does not exhibit any range of values of the feed voltage in which neither the main control circuit 13 nor the starting control circuit 16 are in operation since the direct voltage conversion circuit 2 would remain in the starting phase in this case.

As indicated by the dot-dashed line 18 in FIG. 2, the voltage detector 20 and the switch-off element 21, in addition to the circuit parts mentioned in FIG. 1, are advantageously integrated on a semiconductor crystal in this circuit arrangement.

As a variation of the example described which provides a switching-off element 21 for a single-terminal switch-off of the starting control circuit 16, two switch-off elements can also be provided for a two-terminal switch-off.

Figure 3:
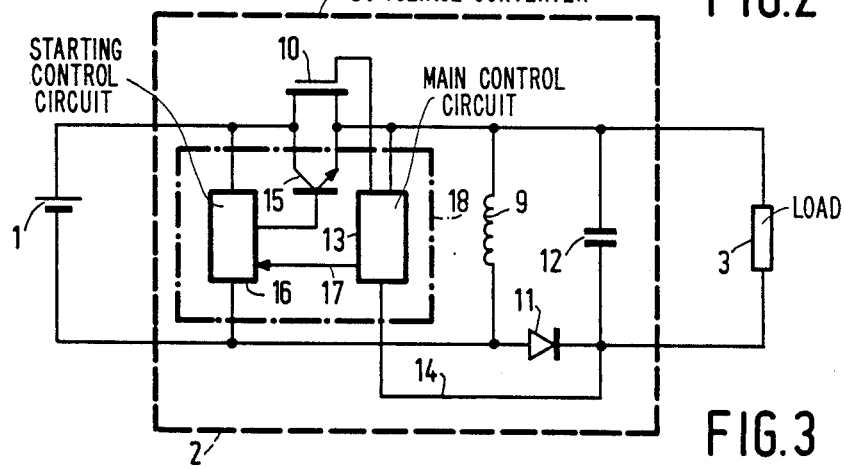
FIG. 3 shows a further variation of the circuit of FIG. 1.

FIG. 3 shows an illustrative embodiment which essentially corresponds to that of FIG. 1, only the arrangement of the inductive element 9 and of the main switching element 10 having been exchanged with respect to one another so that in this case the series circuit of the rectifier 11 and the smoothing capacitor 12 is arranged in parallel with the inductive element 9 instead of the main switching element 10. As a result, the starting switching element 15 is also moved into an arrangement which is changed compared with FIG. 1 but is still connected in parallel with the main switching element 10. Due to the changed arrangement, the polarity of the feed voltage is also reversed compared with FIG. 1. The main control circuit 13, in particular, is adapted to this changed polarity.

We claim:

1. A circuit arrangement for feeding a load from a low voltage energy source via a direct-voltage conversion circuit, which periodically takes energy from the energy source by means of a main switching element and supplies it as an increased supply voltage to the load via an inductive element and a rectifier, said conversion circuit including a starting switching element by means of which energy for generating the supply voltage is taken from the energy source in a starting phase of the circuit arrangement, characterized by a main control circuit supplied with energy directly from the supply voltage and which periodically controls the main switching element, and a starting control circuit directly and exclusively supplied from the energy source and by which the starting switching element is periodically controlled, the switching periods for the starting switching element being shorter than those for the main switching element, the starting control circuit and thus the starting switching element being switched off when the supply voltage reaches a predetermined value.

2. A circuit arrangement according to claim 1, characterized in that the starting switching element and main switching element are connected in parallel.

3. A circuit arrangement according to claim 1, wherein the main switching element comprises a MOS field-effect transistor and the starting switching element comprises a bipolar transistor.

4. A circuit arrangement according to claim 1, wherein the load comprises an electronically commutated direct-current motor.

5. A circuit arrangement according to claim 1, further comprising a voltage detector by which the supply voltage is detected and the starting control circuit is switched off when the predetermined value of supply voltage is reached.

6. A circuit arrangement according to claim 1, characterized in that a switch-off signal is emitted by the main control circuit for switching off the starting control circuit when the supply voltage reaches the predetermined value.

7. A circuit arrangement according to claim 2 further comprising a voltage detector which detects said supply voltage and switches off the starting control circuit when said predetermined value of supply voltage is reached.

8. A circuit arrangement according to claim 2, characterized in that a switch-off signal is emitted by the main control circuit for switching off the starting control circuit when the supply voltage reaches the predetermined value.

9. A circuit arrangement according to claim 1 further comprising means for inhibiting operation of said main control circuit and said main switching element when the supply voltage is below said predetermined value.

10. A circuit arrangement as claimed in claim 9 wherein the main control circuit switches the main switching element on at a value of the supply voltage which is slightly below said predetermined value so as to provide a short overlap period when both of said switching elements are simultaneously operative.

* * * * *